Aug. 6, 1940.　　J. T. CRANDALL　　2,210,231
FISHING ROD
Filed Sept. 14, 1939
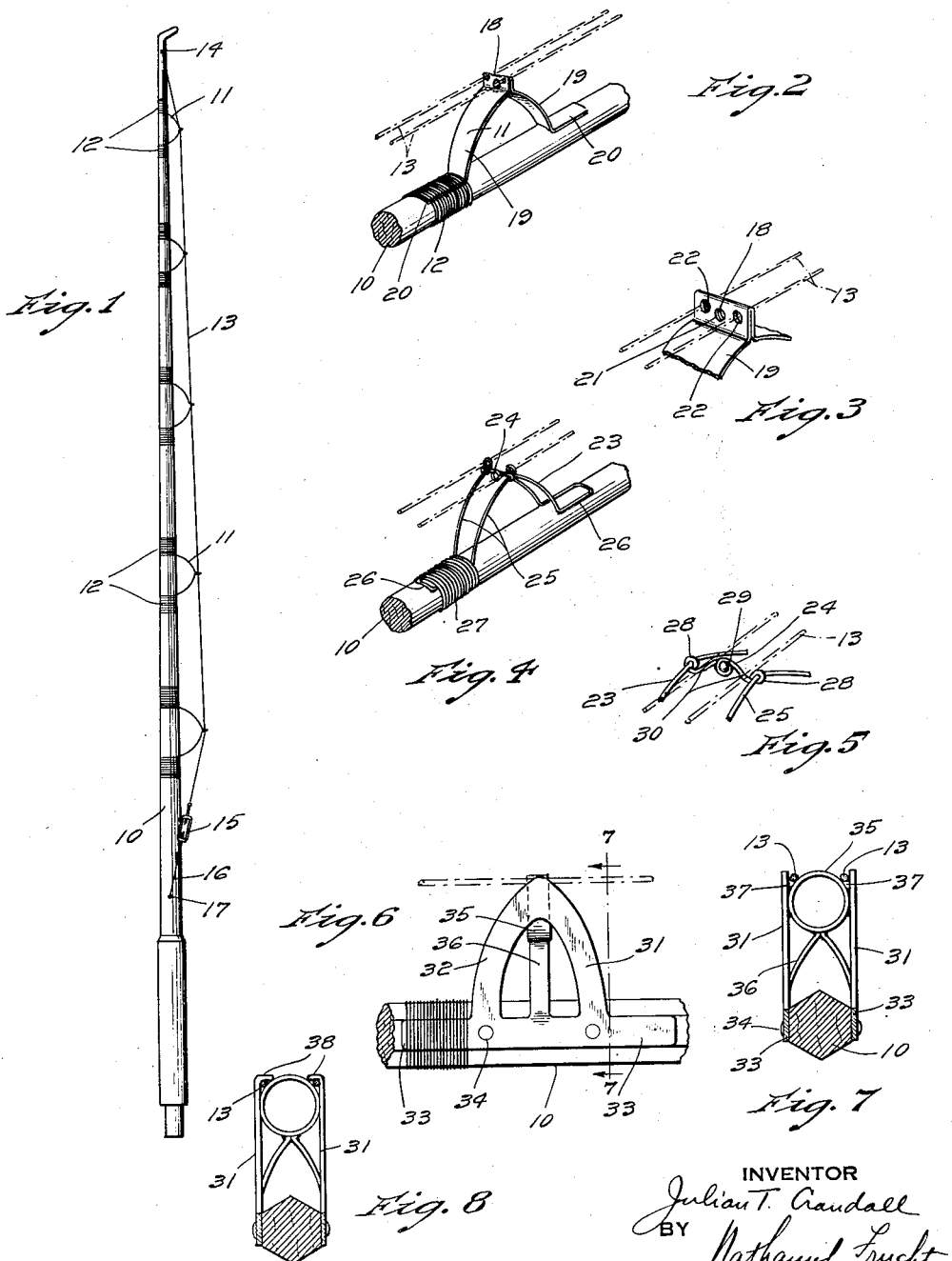
INVENTOR
Julian T. Crandall
BY Nathaniel Frucht
ATTORNEY Patented Aug. 6, 1940

2,210,231

UNITED STATES PATENT OFFICE 2,210,231

FISHING ROD

Julian T. Crandall, Ashaway, R. I., assignor to Ashaway Line & Twine Mfg. Co., a corporation of Rhode Island Application September 14, 1939, Serial No. 294,925

5 Claims. (Cl. 43—18)

My present invention relates to fishing rods and has particular reference to a novel construction for obtaining an adjustable resistance to bending.

It is the principal object of my invention to provide a control for manually regulating the resistance of the rod to bending.

Another object of my invention is to provide a control apparatus of the type described which will not interfere with the desired movement of the line.

Still another object of my invention is to provide a control which can be readily attached to any fishing rod without changing or weakening the rod.

An additional object is to provide a control arrangement which is economically manufactured and which may be readily applied to any fishing rod.

With the above and other objects and advantageous features in view, my invention consists of a novel arrangement of parts more fully disclosed in the detailed description following, in conjunction with the accompanying drawing, and more specifically defined in the claims appended thereto.

In the drawing:

Fig. 1 is a view of a fishing rod of standard type, equipped with the novel control device;

Fig. 2 is an enlarged perspective view of a portion thereof, showing one form of support;

Fig. 3 is an enlarged detail of the upper portion of Fig. 2 showing the openings for the tension cords and for the fish line;

Fig. 4 is a perspective view, similar to Fig. 3, but showing a modified construction;

Fig. 5 is an enlarged perspective view of the upper portion of Fig. 4;

Fig. 6 is a side elevation of a further modified construction, suitable for large fishing rods;

Fig. 7 is a section on the line 7—7 of Fig. 6; and

Fig. 8 is a view similar to Fig. 7, showing a modification thereof.

It has been found desirable to provide a fishing rod with means for adjusting the resistance of the rod to bending, and I have devised a support arrangement which permits the use of cords or wires as tension members for regulatably controlling the bending resistance. The support arrangement preferably consists of a plurality of separated supports, which may be of similar size or may be of different sizes, and which may be readily attached to any standard fishing rod, preferably by wrapping, the tension of the cord or cords which engage the supports being manually regulated, preferably by means of an adjustable turn buckle or the like.

Referring to the drawing, the fish rod 10 has a plurality of spaced supports 11, which, as illustrated in Fig. 1, are of graduated sizes, but which may be of the same size, the supports being secured to the rod by wrappings 12 or the like, see Fig. 2, and serving to carry the fish line and also to receive one or more cords or the like 13, one end of the cords being anchored at the tip of the fishing rod as indicated at 14 and the other end of the cord being attached to a turn buckle 15, which in turn is attached to a cord 16 which is anchored to the reel end of the rod as indicated at 17. As clearly shown in Fig. 2, one form of the support is made of sheet metal, bent upwardly at the center to provide a bridge portion 18 from which two depending arcuate portions 19 extend, and terminate in tabs 20 shaped to fit a standard rod. The bridge portion 18 has a center opening 21 through which the fish line is preferably passed, and two spaced openings 22 which may be slots or grooves for receiving two tension cords 13. With the above described construction the supports 11 not only furnish guide passages for the fish line but also provide passageways for the tension cords, the tension of these cords being regulated by turning their turn buckles 15 so as to obtain a desired bending resistance of the rod.

Instead of using a sheet metal construction as disclosed in Fig. 2, a wire construction such as illustrated in Figs. 4 and 5 may be used, the wire support 23 being made with an upper bridge portion 24 which is secured to the sides 25, the sides being preferably arcuately shaped and terminating in U-shaped, laterally extending ends 26 which may be readily wrapped to the fishing rod as indicated at 27. The bridge portion 24 may be of a separate piece of wire which is joined to the sides 25, as by eyes 28, or which may be welded to the sides, a central opening 29 being formed therein for receiving the fishing line, and two side troughs or bends 30 being provided to receive the tension cords. The wire construction is preferred for certain types of light fishing rods, as very little is added to the weight of the rod.

For heavy rods, it is preferred to use sheet metal constructions such as illustrated in Figs. 6 to 8 inclusive, the supports comprising two sheet metal end plates 31, of the form shown in Fig. 6, with arcuate sides 32 and laterally extending end tabs 33 which may be wrapped to the fishing rod, or may be bolted thereto as indicated at 34, the sides supporting an inner ring 35, auxiliary straps 36 preferably extending upwardly from the sides between the arcuate portions thereof and welded or otherwise secured to the lower portion of the ring 35 to afford a strong support therefor in conjunction with the sides, the bends all being preferably welded to provide an integral support. As illustrated in Fig. 7, the sides extend upwardly to provide recesses 37 within which the tension cords 13 may seat, the fishing line extending through the rings 35. If desired, the sides may be made sufficiently long to be bent over as indicated at 38 in Fig. 8, to effectively secure the tension cords in place and prevent disengagement of the cords from the supports.

The above described constructions provide a simple and effective means for supporting tension cords, which are preferably of elastic textile material, but which may if desired be of elastic metal wire, the supports being readily manufactured, and being easily attached to any type of fishing rod. Any suitable means for changing the tension of the cords may be employed, the preferred arrangement including a turn buckle.

While I have described specific constructional embodiments of my invention, it is obvious that changes in the size and shape of the parts and in the material therefor may be made to suit different types of fishing rods, without departing from the spirit and scope of the invention as defined in the appended claims.

I claim:

1. In combination, a fishing rod, spaced supports on said rod, and means associated with said spaced supports for changing the resistance of said rod to bending.

2. In combination, a fishing rod, spaced supports on said rod, and means associated with said spaced supports including an elastic cord for changing the resistance of said rod to bending.

3. In combination, a fishing rod, spaced supports on said rod, and manually adjustable means associated with said spaced supports for changing the resistance of said rod to bending.

4. In combination, a fishing rod and spaced supports on said rod, said supports having seats for receiving an elastic cord, the ends of said elastic cord being attached to the tip and reel ends of said rod, said cord being under adjusted tension to increase the resistance of said rod to bending.

5. In combination, a fishing rod, and spaced supports on said rod, said supports each having spaced seats for receiving an elastic cord, the ends of said elastic cord being attached to the tip and reel ends of said rod, said cord being under adjusted tension to increase the resistance of said rod to bending.

JULIAN T. CRANDALL.